United States Patent [19]

Braden et al.

[11] Patent Number: 4,993,314
[45] Date of Patent: Feb. 19, 1991

[54] CONVECTIVELY COOLED HOT GAS EXHAUST STRUCTURE TO REDUCE INFRARED RADIATION

[75] Inventors: John R. Braden, Annapolis; Robert H. Burns, Arnold; Melvin Greenberg, Annapolis, all of Md.

[73] Assignee: The United States of America as represented by the Secretary of the Navy, Washington, D.C.

[21] Appl. No.: 660,200

[22] Filed: Feb. 20, 1976

[51] Int. Cl.$^5$ ............................................. F23J 11/04
[52] U.S. Cl. ...................................... 98/58; 110/184; 114/187; 239/127.3
[58] Field of Search .................. 239/127.1, 127.3; 114/187; 110/184, 121; 98/46, 67, 58; 60/264, 265, 271

[56] References Cited

U.S. PATENT DOCUMENTS

| | | | |
|---|---|---|---|
| 2,601,663 | 6/1952 | Lamb | 114/187 |
| 2,631,796 | 3/1953 | Williamson, Jr. et al. | 60/264 |
| 2,841,071 | 7/1958 | Stawsine | 98/46 |
| 3,817,030 | 6/1974 | Renius et al. | 60/271 |
| 3,970,252 | 7/1976 | Smale et al. | 60/271 |
| 4,004,416 | 1/1977 | Amelio et al. | 60/271 |

Primary Examiner—Stephen C. Bentley
Attorney, Agent, or Firm—Luther A. Marsh; Sol Sheinbein

[57] ABSTRACT

The invention is a new design for a structure such as a stack for exhausting hot gases. One embodiment is that of the top portion of a ship's stack (the watchcap) for exhausting a hot steam plant, a gas turbine, a diesel or other engine, or burner exhaust gases. The function of the invention is to reduce the infrared radiation generated by the hot metal of the exhaust pipe and surrounding structure. This function is accomplished by constructing an annular plenum chamber around a portion of the length of the smokepipe. The plenum chamber has air flow channels, an arrangement of insulation, and openings, top and bottom, so that convective air flow is established at the hot smokepipe wall. The thermal gradient produced also induces a secondary cool-air-flow along an outer wall. Another feature is an arrangement of a double-walled shield extending above, below, and around the terminal end of the smokepipe that blocks the low angle view into the hot smokepipe. The shield is cooled by an ambient air flow that is induced by the escaping exhaust gases.

6 Claims, 2 Drawing Sheets

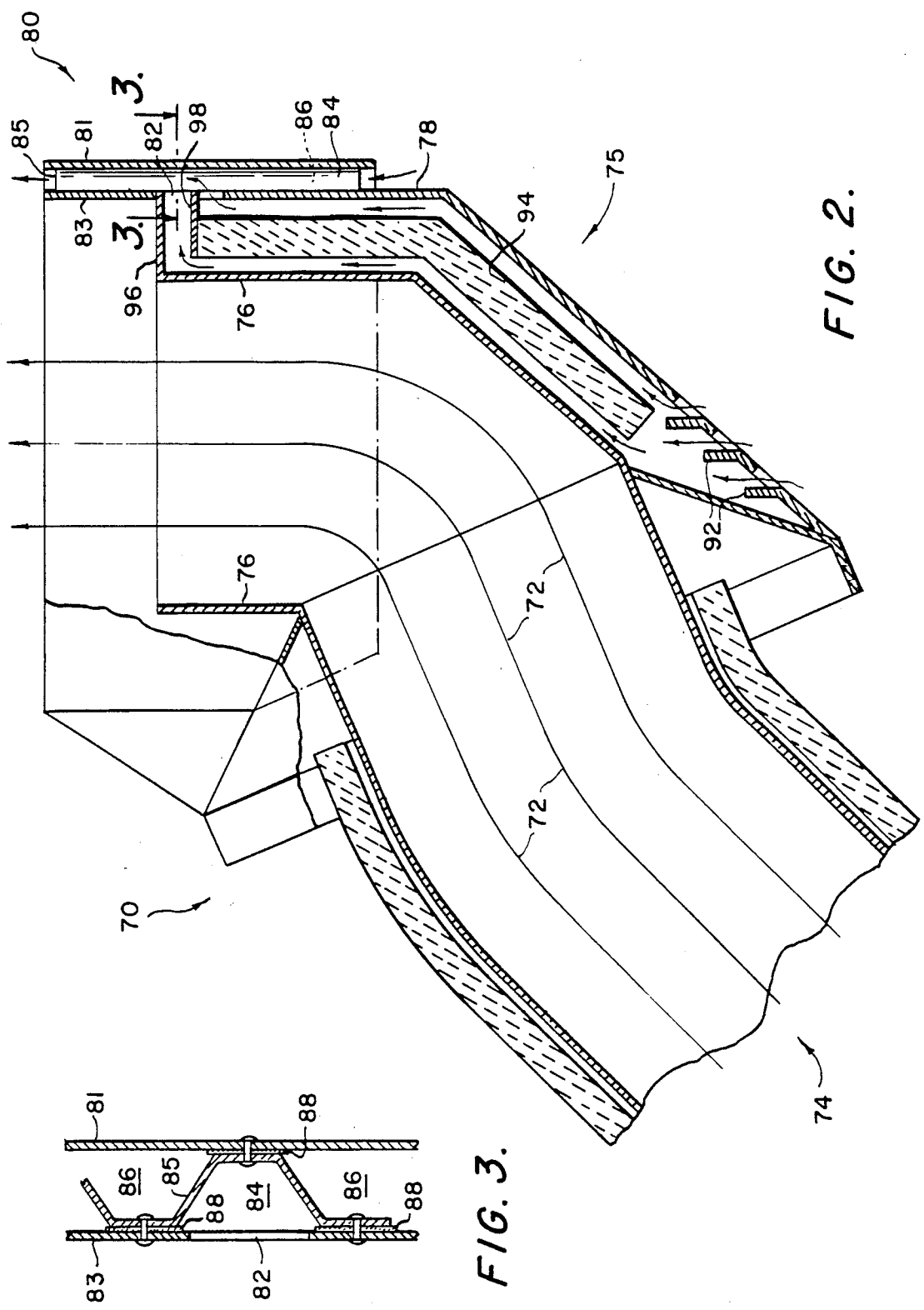

CONVECTIVELY COOLED HOT GAS EXHAUST STRUCTURE TO REDUCE INFRARED RADIATION

The invention described herein may be manufactured and used by or for the government of the United States of America for governmental purposes without the payment of any royalties thereon or therefor.

BACKGROUND OF THE INVENTION

Heat-seeking (infrared) detection systems employed by missiles, other weapons, or devices can detect the infrared radiation emitted by hot gas exhaust structures on military targets, such as ships, aircraft, or ground installations. These devices employ this radiation for weapon guidance, or for reconnaissance and classification purposes. The infrared detection vulnerability of military targets can be reduced by decreasing the temperatures of the hot gas exhaust structures such as ships' stacks.

The prior art shows at least two unsuccessful schemes for the reduction of steam-ship stack temperatures. The first scheme involves the use of sea water sprayed into the stack gases and cavity. This reduced the infrared radiation by one-half, and is not sufficient to defeat known infrared detection systems. The second scheme uses ambient air which, after traversing cooling passages, is aspirated into the exhaust gas path within the smokepipe. Due to the design of the smokepipe and since power conditions are frequently changed, exhaust velocities would change and result in an uncontrolled situation. Additionally at relatively low exhaust gas velocities, the flow of the hot exhaust gases through the cooling passages might result rather than their flowing out of the top of the stack, thus defeating the intent of the scheme. The second scheme also uses a single-walled shield to prevent low-angle viewing into the smokepipe, but such a shield is, itself, susceptible to heating by wind-blown exhaust gases, a condition which would defeat its purpose.

SUMMARY OF THE INVENTION

Briefly, the instant invention overcomes the disadvantages of the prior art, in that it does not employ water cooling thereby avoiding the problems of corrosion, clogging, or other maintenance problems. Air is drawn from the ambient through openings spaced around the stack at the bottom of the watchcap portion and then into a concentric and peripheral passage. A piece of insulation is encapsulated and suspended so as to divide the passage into an inner passage adjacent the inner stack-gas wall, and an outer passage adjacent the outer stack wall.

The thermal gradient that is established from the hot inner-wall smokepipe, across the first air passage, the self-supporting insulation, the second air passage, and finally the outer stack wall, induces thermal convection currents of cooling ambient air flowing up the two air passages. The warmed, ambient air is exited toward the outside through openings around the periphery of the outer stack wall just below the top of the smokepipe. There is a shield around, and larger in diameter than the top of the smokepipe. This shield blocks the view from low elevation angles of the hot inner smokepipe, and produces cooling air convection flow. The shield is made of concentric double walls to assure a cool outer wall, since, in high winds, the exhaust gases often come into contact with the inner wall of the shield.

OBJECTS OF THE INVENTION

Accordingly, it is an object of the present invention to provide a new and improved infrared suppression system for smokestacks of ships and other power plants.

Another object of the invention is to reduce the infrared signature of a ship at sea.

A further object of the present invention is to limit the elevation angle at which a stack can be detected in the infrared radiation range.

Other objects and advantages of the present invention will be appreciated as the same become better understood from the following specifications and accompanying drawings.

BRIEF DESCRIPTION OF THE DRAWINGS

FIG. 2 is a side cross-section of a ship's side exiting stack according to another embodiment of the invention.

FIG. 3 is a vertical cross-section taken along line 3—3 of FIG. 2 showing the connecting details.

DESCRIPTION OF THE PREFERRED EMBODIMENT

Figure 1:
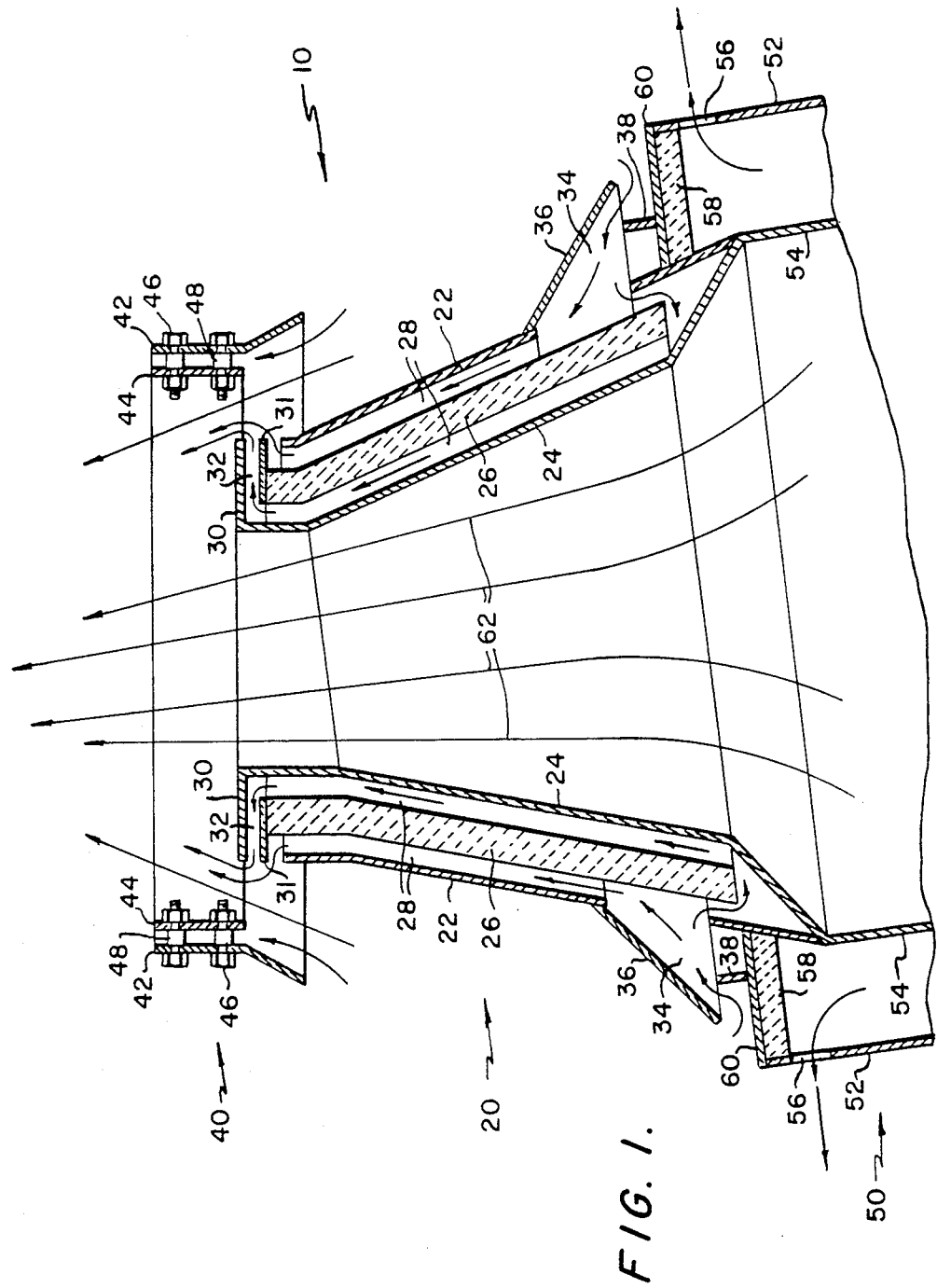
FIG. 1 is a side cross-section of a ship's stack and particularly the watchcap section according to one embodiment of the invention.

Referring now to the drawings, the invention will be described as a vertically exhausting smokestack of a ship and is concerned with infrared radiation suppression; however, it will be obvious that it could be used in any installation such as a stationary power plant, where it is desired to reduce the infrared radiation emitted.

FIG. 1, showing a typical embodiment of a stack 10, generally comprises three main sections: a watchcap 20, a shield 40, and a lower stack section 50. The ship's stack body (not shown) below that shown in the figure is of conventional design, and may have its axis raked slightly aft, and forms no part of the present invention.

The watchcap 20 is a plenum chamber made up of an outer wall 22 and an inner wall 24 in contact with the stack gases 62, shown by arrows. Interposed therebetween is a piece of suspended, incapsulated insulation 26, all similiar in shape to a truncated cone converging toward the top. The purpose of this shape is to increase the exhaust gas velocity to keep hot gases away from the shield 40. Between the walls and the insulation, are formed air passages 28. At the top of the inner wall 24, is a ring-shaped collar 30 extending outwardly, and leaving a horizontal air passage 32 directed outwardly, for the exiting of the convective cooling air from the inner air passage. Passage 32 is divided by a splitter plate 31 connected at the top to the insulation 26. At the bottom of the watchcap section 20 is a passage 34 for the ambient air intake, the passage is formed by a rain deflecting skirt 36 and a coaming 38 connected to the annular cover plate 60 of the lower stack portion 50.

Referring now to the shield 40, an outer ring 42 has a straight portion and a flared portion for inducting air as shown by the arrows. An inner ring 44 is concentric with the outer ring 42, connected to and spaced therefrom by a plurality of fasteners, such as nuts and bolts, rivets, or the like, and thermal insulating spacers 48. The annular space created forms another passage for the convection of air to further cool the stack shield 40, thus reducing the infrared radiation emitted. This shield is attached to the top of the watchcap section 20 by any conventional means that eliminates conductive heat flow, for example by bolting with insulating spacers (not shown).

Referring now to the lower stack portion 50, an outer shell 52 is concentric with and spaced from the inner shell 54 of the lower stack portion 50, the inner shell being in heat exchange contact with the stack gases, shown by arrows 62. An annular passage created therebetween, forms another passage for the convection of air which is exited as shown by arrows to the environment through a plurality of openings 56 and A ring of incapsulated insulation 58 restricts the flow of heat to the watchcap section 20. On top of the insulation 58, a connecting ring 60, connects and seals the outer shell 52 with the inner shell 54. As previously discussed, the coaming 38 is fastened, as by welding, to the top of the connecting ring 60. Throughout the structure, while not specifically mentioned, any feasible and conventional fastening means, such as welds, rivets, threaded fasteners, etc., may be used to join the structural elements with the use of thermal insulating spacers where indicated.

The operation of the smokestack cooling system is as follows. Air enters the lower stack portion 50 from the atmosphere or boiler rooms at a lower position than is shown in the drawing and flows by convection through the annular passages between shells 52 and 54 and exits to the atmosphere through openings 56.

Above, in the watchcap section 20, which is smaller in diameter than the lower portion 50, air is aspirated up and over the coaming 38, under skirt 36. Here the air flow splits, as shown by the arrows, down and around the insulation 26, through the passage 28 next to the inner wall 24, exiting above splitter plate 31 via passage 32 and also through the passage 28 next to the outer wall 22 exiting below splitter plate 31. The airflow from both passages exits outwardly and peripherally away from the stack gases.

Further, above the watchcap section 20, the shield 40 is larger in diameter and thus forms an air passage between the two, which the long straight arrows show. Also the flared skirt of the outer ring 42, in cooperation with the spaced inner ring 44, guides the cooling air flow. Further, the stack gases, at the exit of the watchcap, are accelerated by the converging truncated, cone-shaped section 20 to create a low pressure area around the exhaust gas plume. Thus cooling air is drawn in under the flared skirt forming a cool peripheral air curtain around the hot stack gases separating them from the shield. Also the shield physically blocks a view of the hot inner smokepipe from low elevation angles, i.e. those near the horizontal plane.

The infrared radiation suppression achieved by this invention results from two factors. One is that the shield is above and larger than the hot stack exit thus obscuring a view from low elevation angles. The second is that the watchcap portion of the stack is cooled by convection air flow to reduce infrared radiation. The net result is that a missile guidance sensor, in order to detect the stack, must approach at a higher elevation angle, at which it can be detected and countered more readily.

Obviously, many modifications and variations of the present invention are possible in light of the above techniques. For example, some of the Navy's newer ships have rectangular port and starboard side-exiting stacks. In these cases, the same principles may be feasibly applied after the exhaust flow is turned to the vertical. They include peripheral air passages to cool the outside wall of the stack, an encapsulated insulation package, and a shield cooled by a peripheral air curtain.

The side-exiting stack design 70, shown in FIG. 2, differs from the vertical exhausting stack in the following ways. The exhaust gas, shown by arrows 72, flow up the existing stack 74, which has in this case, but not limited to, a rectangular cross-section, and through a new stack section 75 which also has a rectangular cross-section substantially the same size as existing stack 74. The new stack section 75 comprises an inner stack wall 76 and an outer wall 78, and a piece of incapsulated insulation 94 supported between the walls 76 and 78. The insulation 94 is planar and may be required only on the three sides facing outward of a ship, since the fourth side is against the side of the ship.

Cooling air from the ambient is admitted through punched and tabbed slots 92. The inwardly depressed tabs 92 form a staggered coaming on the bottom outside of the stack only to eliminate water. The air follows the less tortuous path.

An upper shield 80, having an outer shield 81 that is straight and having no flared skirt, is connected at the top of the outer stack wall 78 and an inner shield 83 and shown in FIG. 3. This inner shield 83 is an extension of the outer stack wall 78. As is shown in detail in FIG. 3, the connection is made by a corrugated connecting member 85, insulated by thermal insulating strips 88 from the inner shield 83 and the outer shield 81, using conventional fasteners, such as rivets, bolts, or the like. This upper shield 80 exists on the three outer sides of the rectangular stack, the inner side being against the ship's side.

In operation of this embodiment, as in the first embodiment, air flows in inner and outer air flow channels formed by the insulation and inner and outer walls and exits on either side of a splitter plate 98 attached to the top of the insulation 94. The air then flows out through openings 82 formed in the inner shield 83 and into the alternating corrugation areas 84 that are present on one side of the corrugated connecting member 85. On the outer side of the corrugated member areas 86 are formed.

As is best shown in FIG. 3, cooling ambient air is aspirated through both corrugated areas 84 and 86 of corrugated member 85, where the inside areas 84 also receive exited channel cooling air from below, from new stack section 75, but the outside areas 86 do not.

It is therefore to be understood that within the scope of the apprended claims, the invention may be practiced otherwise than as specifically described.

What is claimed is:

1. A smokestack for exhausting hot gases that reduces the infrared radiation of the stack and blocks the low elevation angle view into the hot smokepipe comprising:

a watchcap having inner and outer walls forming a peripheral thermal insulating plenum chamber surrounding a portion of the smokepipe;

insulation means mounted between and in spaced relation to said walls;

a first air passage in said plenum chamber between said inner wall and said insulation;

a second air passage in said plenum chamber between said outer wall and said insulation;

thereby allowing convection flow of cooling air in said plenum chamber;

means for causing said air in said passages to exit peripherally away from the stack gases at the top of said watchcap; and means for inducting said cooling air into said passages at the bottom of said watchcap.

2. The smokestack of claim 1 further comprising: shield means at the top of said watchcap, said shield having a diameter larger than said watchcap and including an outer ring having a flared skirt and a concentrically spaced inner ring forming a peripheral air passage therebetween for the convection of air.

3. The smokestack of claim 2 wherein said means for causing said air to exit peripherally comprises:

an annular collar forming a horizontal air passage over said insulation means extending from said inner wall toward said outer wall; and a splitter plate dividing said horizontal air passage and extending from the top of said insulation toward said outer wall.

4. The smokestack of claim 1 wherein said watchcap further comprises:

upwardly converging and concentric truncated conical inner and outer walls for constricting the flowing stack gases.

5. The smokestack of claim 4 wherein:

said insulation means between said inner and outer walls of said watchcap is incapsulated.

6. The smokestack of claim 5 wherein said shield means further comprises:

a plurality of thermal insulating spacers maintaining a spaced relationship between said inner and outer rings.

* * * * *